United States Patent
Ben-Lavi et al.

(10) Patent No.: US 11,158,075 B2
(45) Date of Patent: Oct. 26, 2021

(54) METHOD, SYSTEM AND APPARATUS FOR DEPTH SENSOR ARTIFACT REMOVAL

(71) Applicant: ZEBRA TECHNOLOGIES CORPORATION, Lincolnshire, IL (US)

(72) Inventors: Eliezer Azi Ben-Lavi, Waterloo (CA); Richard Jeffrey Rzeszutek, Toronto (CA); Paul D. Haist, Toronto (CA); Venu Kurella, Hamilton (CA)

(73) Assignee: Zebra Technlogies Corporation, Lincolnshire, IL (US)

(*) Notice: Subject to any disclaimer, the term of this patent is extended or adjusted under 35 U.S.C. 154(b) by 329 days.

(21) Appl. No.: 16/429,523

(22) Filed: Jun. 3, 2019

(65) Prior Publication Data

US 2020/0380709 A1 Dec. 3, 2020

(51) Int. Cl.
 G06K 9/00 (2006.01)
 G06T 7/55 (2017.01)
 G06K 9/03 (2006.01)
 G06K 9/40 (2006.01)
 G06T 7/50 (2017.01)

(52) U.S. Cl.
 CPC .............. G06T 7/55 (2017.01); G06K 9/03 (2013.01); G06K 9/40 (2013.01); G06T 7/50 (2017.01); *G06T 2207/10028* (2013.01); *G06T 2207/20004* (2013.01)

(58) Field of Classification Search
 CPC ........... G06K 9/00201; G06K 9/00664; G06K 9/00771; G06K 9/03; G06K 9/3241; G06K 9/342; G06K 9/36; G06K 9/38; G06K 9/40; G06T 7/0002; G06T 7/50; G06T 7/521; G06T 7/55; G06T 7/70; G06T 2207/10028; G06T 2207/20004; G06T 2207/30168; G06T 5/001; G06T 5/002; G06T 5/005; G06T 5/50
 USPC ....... 382/100, 106, 141, 153, 154, 254, 260, 382/261, 275; 345/419–421, 424, 611, 345/616, 620, 629; 705/28; 356/3, 3.08, 356/3.1, 3.14
 See application file for complete search history.

(56) References Cited

U.S. PATENT DOCUMENTS

| | | | |
|---|---|---|---|
| 10,341,633 B2 * | 7/2019 | Lindner | G06T 7/593 |
| 10,663,590 B2 * | 5/2020 | Rzeszutek | G01S 17/42 |
| 10,776,661 B2 * | 9/2020 | Gu | G06T 7/55 |
| 2013/0121564 A1 * | 5/2013 | Kitamura | G06T 7/12 382/154 |
| 2015/0109290 A1 * | 4/2015 | Chang | G06T 5/002 345/420 |
| 2019/0073550 A1 * | 3/2019 | Obotnine | G06K 9/22 |

* cited by examiner

Primary Examiner — Eric Rush (57) ABSTRACT

A method in an imaging controller of detecting depth sensor artifacts includes: obtaining, from first and second sensors, first and second pluralities of points defined by respective (i) planar positions and depths in a common frame of reference, and (ii) scan angles relative to field of view centers of the first or second sensors; for each of a subset of candidate points from the first plurality of points: searching the second plurality of points for a validator point having (i) a planar position within a threshold distance of a planar position of the candidate point, and (ii) a scan angle smaller than a scan angle of the candidate point; responsive to identifying the validator point: when the depth of the validator point exceeds the depth of the candidate point, classifying the candidate point as an artifact.

20 Claims, 10 Drawing Sheets

METHOD, SYSTEM AND APPARATUS FOR DEPTH SENSOR ARTIFACT REMOVAL

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets. A mobile automation apparatus may be deployed within such facilities to perform tasks at various locations. For example, a mobile automation apparatus may be deployed to capture data representing an aisle in a retail facility. The mobile automation apparatus may, for example, employ depth sensors to capture a point cloud representing the aisle, shelves, and objects disposed thereon. However, depth sensors may generate artifacts such as points that do not correspond to any physical object. Such artifacts can reduce the accuracy of captured data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in an imaging controller of detecting depth sensor artifacts, the method comprising: obtaining, from a first sensor, a first plurality of points defined by respective (i) first planar positions and first depths in a common frame of reference, and (ii) first scan angles relative to a field of view (FOV) center of the first sensor; obtaining, from a second sensor, a second plurality of points defined by respective (i) second planar positions and second depths in the common frame of reference, and (ii) second scan angles relative to an FOV center of the second sensor; for each of a subset of candidate points from the first plurality of points: searching the second plurality of points for a validator point having (i) a second planar position within a threshold distance of a first planar position of the candidate point, and (ii) a second scan angle smaller than a first scan angle of the candidate point; responsive to identifying the validator point: when the second depth of the validator point exceeds the first depth of the candidate point, classifying the candidate point as an artifact.

Additional examples disclosed herein are directed to a computing device comprising: a memory storing: a first plurality of points from a first sensor, defined by respective (i) first planar positions and first depths in a common frame of reference, and (ii) first scan angles relative to a field of view (FOV) center of the first sensor; and a second plurality of points from a second sensor, defined by respective (i) second planar positions and second depths in the common frame of reference, and (ii) second scan angles relative to an FOV center of the second sensor; and an imaging controller configured, for each of a subset of candidate points from the first plurality of points: search the second plurality of points for a validator point having (i) a second planar position within a threshold distance of a first planar position of the candidate point, and (ii) a second scan angle smaller than a first scan angle of the candidate point; and responsive to identification of the validator point: when the second depth of the validator point exceeds the first depth of the candidate point, classify the candidate point as an artifact.

Figure 1:
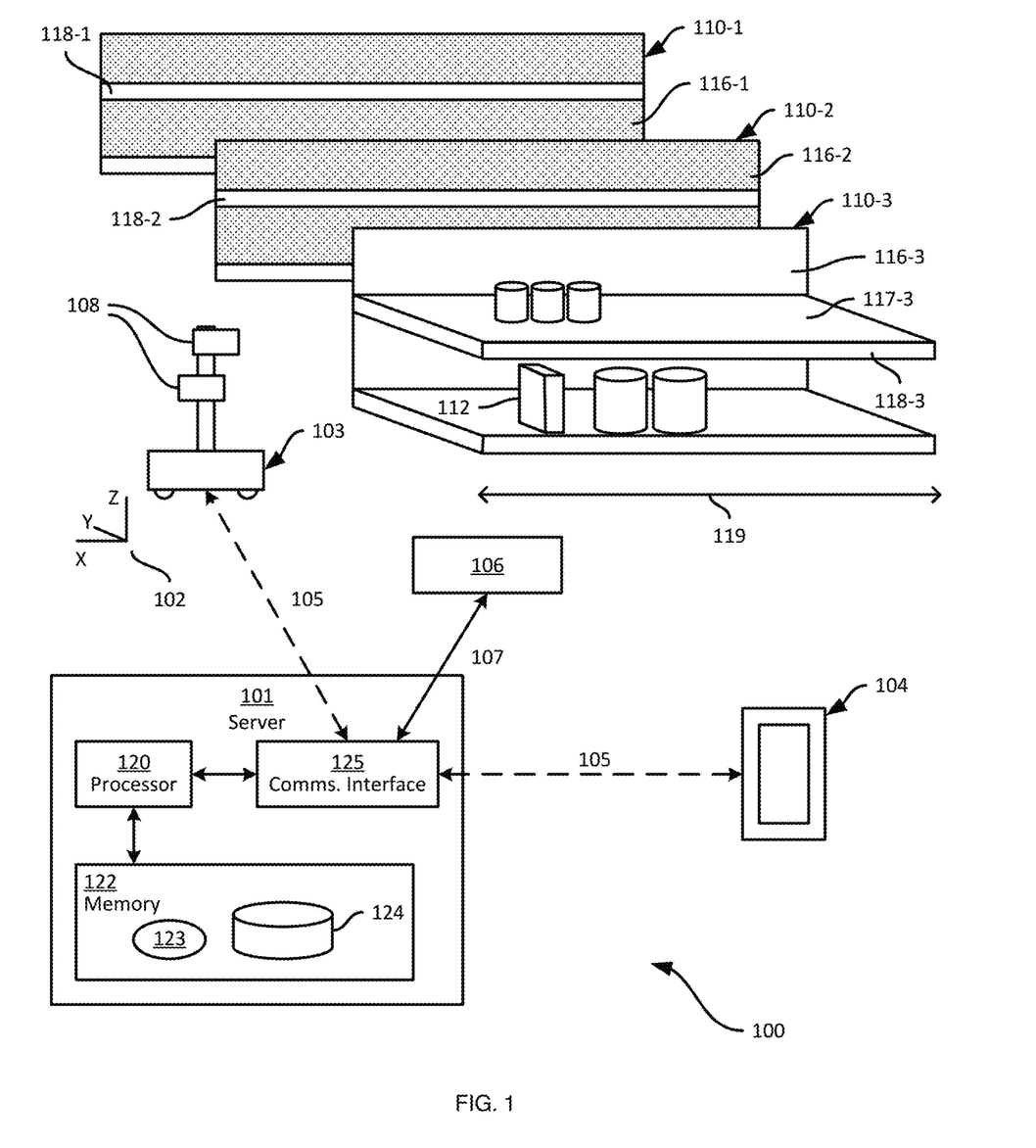
FIG. 1 is a schematic of a mobile automation system.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is also specifically designed, as will be discussed in detail herein, to process depth measurements captured by the apparatus 103 representing the shelf modules 110, in order to detect and remove artifacts from the depth measurements. The depth measurements, as well as image data captured by the apparatus 103, can be provided to product status detection mechanisms (which may also be implemented by the processor 120 itself). As will be apparent in the discussion below, removal of artifacts from the depth measurements can improve the accuracy of such product status detection mechanisms.

The processor 120 is interconnected with a non-transitory computer readable storage medium, such as a memory 122.

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The memory 122 stores computer readable instructions for performing various functionality, including control of the apparatus 103 to navigate the modules 110 and capture shelf data, as well as post-processing of the shelf data. The execution of the above-mentioned instructions by the processor 120 configures the server 101 to perform various actions discussed herein. The applications stored in the memory 122 include an artifact detection application 123 (also simply referred to as the application 123). The application 123 may also be implemented as a suite of logically distinct applications. each implementing a suitable portion of the functionality discussed below. In general, via execution of the application 123 or subcomponents thereof and in conjunction with other components of the server 101, the processor 120 performs various actions to detect, in depth measurements representing the shelves 110 (e.g. data captured by the apparatus 103), artifacts that do not correspond to real objects (i.e. depth measurements that indicate the presence of an object when in fact no such object is present).

The memory 122 can also store data for use in the above-mentioned control of the apparatus 103, such as a repository 124 containing a map of the retail environment and any other suitable data (e.g. operational constraints for use in controlling the apparatus 103, data captured by the apparatus 103, and the like).

The processor 120, as configured via the execution of the control application 128, is also referred to herein as an imaging controller 120, or simply as a controller 120. As will now be apparent, some or all of the functionality implemented by the imaging controller 120 described below may also be performed by preconfigured special purpose hardware controllers (e.g. one or more logic circuit arrangements specifically configured to optimize the speed of image processing, for example via FPGAs and/or Application-Specific Integrated Circuits (ASICs) configured for this purpose) rather than by execution of the application 123 by the processor 120.

The server 101 also includes a communications interface 125 interconnected with the processor 120. The communications interface 125 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 125 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 125 for storage (e.g. in the repository 124) and subsequent processing (e.g. to detect artifacts in depth data, as noted above). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
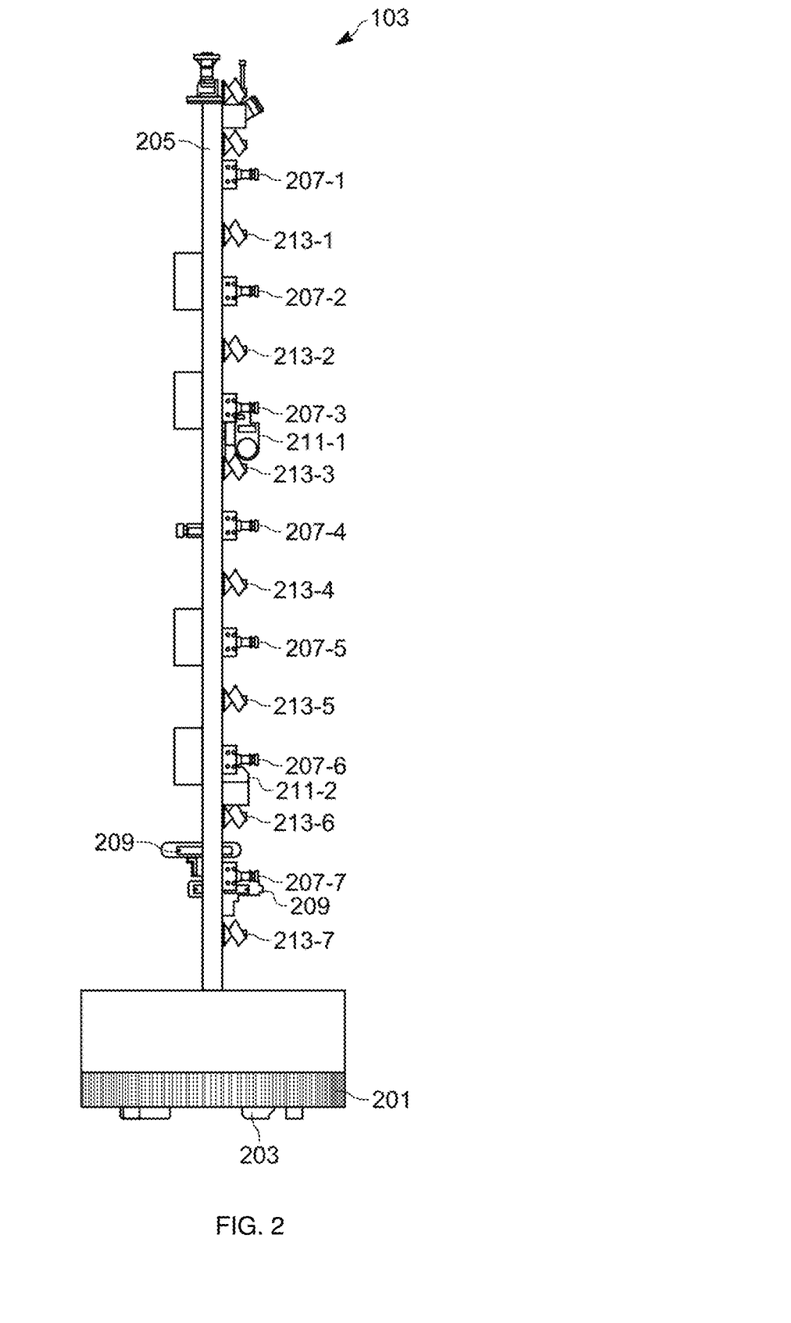
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. In other examples, the mast 205 can support additional LIDAR sensors 211 (e.g. four LIDARs 211). As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. That is, the illumination assembly 213-1 illuminates the field of view of the camera 207-1, and so on. The cameras 207 and LIDARs 211 are oriented on the mast 205 such that the fields of view of the sensors each face a shelf 110 along the length 119 of which the apparatus 103 is traveling. As noted earlier, the apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
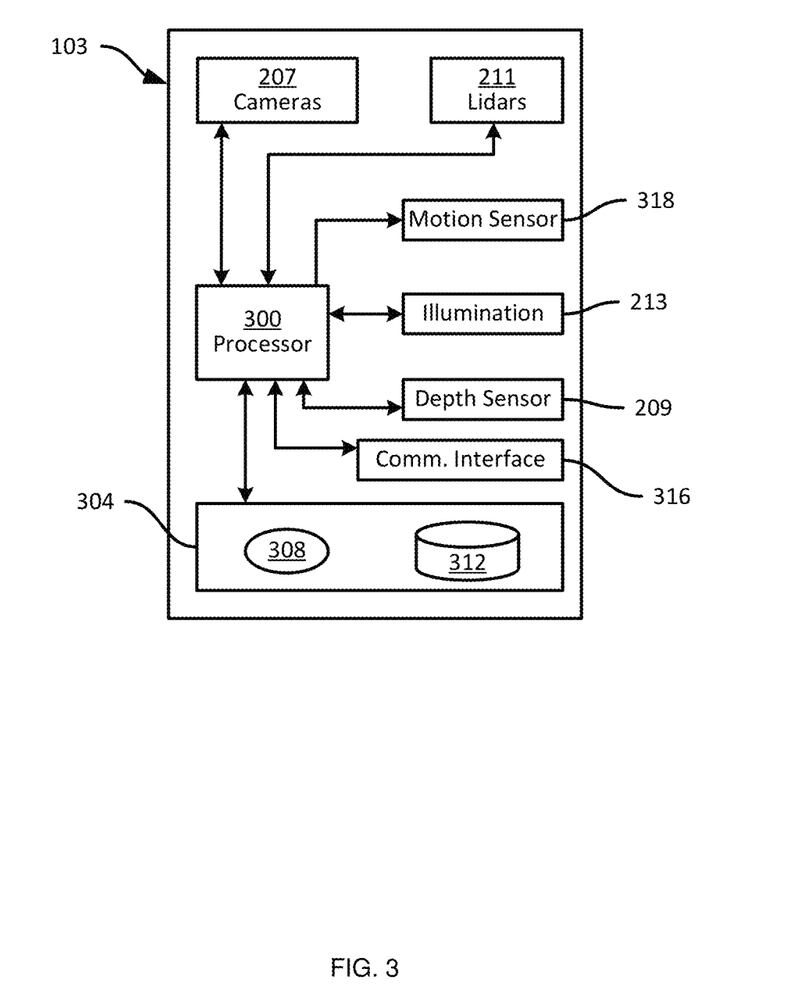
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, LIDARs 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The memory 304 stores computer readable instructions for execution by the processor 300. In particular, the memory 304 stores an apparatus control application 308 which, when executed by the processor 300, configures the processor 300 to perform various functions related to navigating the facility and controlling the sensors 108 to capture data, e.g. responsive to instructions from the server 101. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308. The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations.

In addition to the sensors mentioned earlier, the apparatus 103 includes a motion sensor 318, such as one or more wheel odometers coupled to the locomotive assembly 203. The motion sensor 318 can also include, in addition to or instead of the above-mentioned wheel odometer(s), an inertial measurement unit (IMU) configured to measure acceleration along a plurality of axes.

Figure 4:
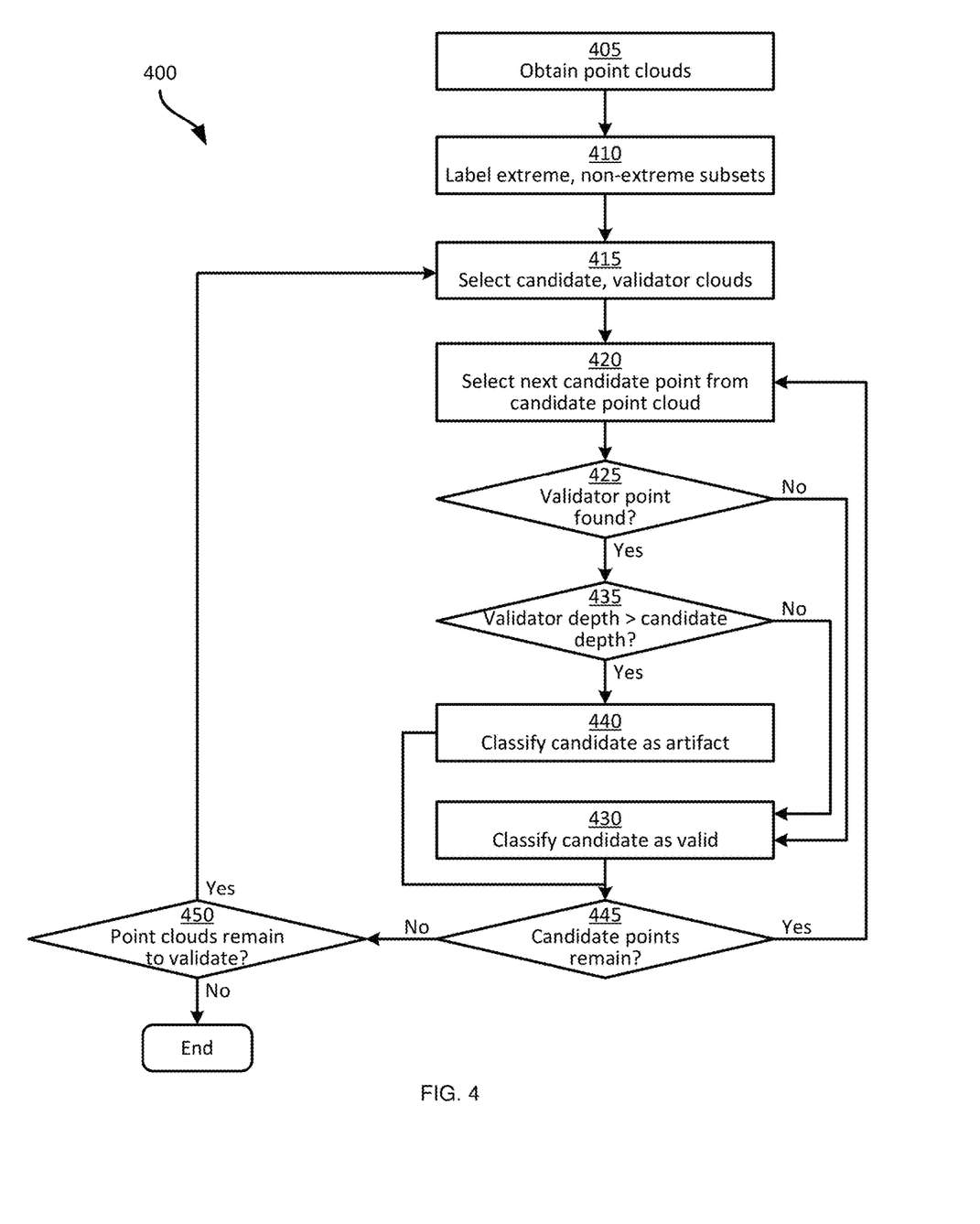
FIG. 4 is a flowchart of a method of detecting depth sensor artifacts in the system of FIG. 1.

The actions performed by the server 101, and specifically by the processor 120 as configured via execution of the application 123, to detect artifacts in depth measurements representing the shelves 110 (e.g. captured by the apparatus 103) will now be discussed in greater detail with reference to FIG. 4. FIG. 4 illustrates a method 400 of detecting depth sensor artifacts. The method 400 will be described in conjunction with its performance in the system 100, and in particular by the server 101, with reference to the components illustrated in FIG. 1. As will be apparent in the discussion below, in other examples, some or all of the processing described below as being performed by the server 101 may alternatively be performed by the apparatus 103.

At block 405, the server 101 obtains at least two pluralities of depth measurements, each captured by a distinct depth sensor of the apparatus 103. In the present example, the first plurality of depth measurements is captured by the LIDAR sensor 211-1, while the second plurality of depth measurements is captured by the LIDAR sensor 211-2. Each plurality of depth measurements is also referred to herein as a plurality of points, or simply as a point cloud. Although the examples below describe an implementation with two LIDARs 211, and therefore two point clouds, the method 400 may also be implemented with more than two LIDARs 211, and the server 101 may therefore obtain more than two point clouds at block 405. The point clouds obtained at block 405 may be obtained by retrieving them from the memory 122 (e.g. the repository 124), following earlier receipt of the point clouds (or raw data with which the point clouds are generated) at the server 101 from the apparatus 103.

Figure 5:
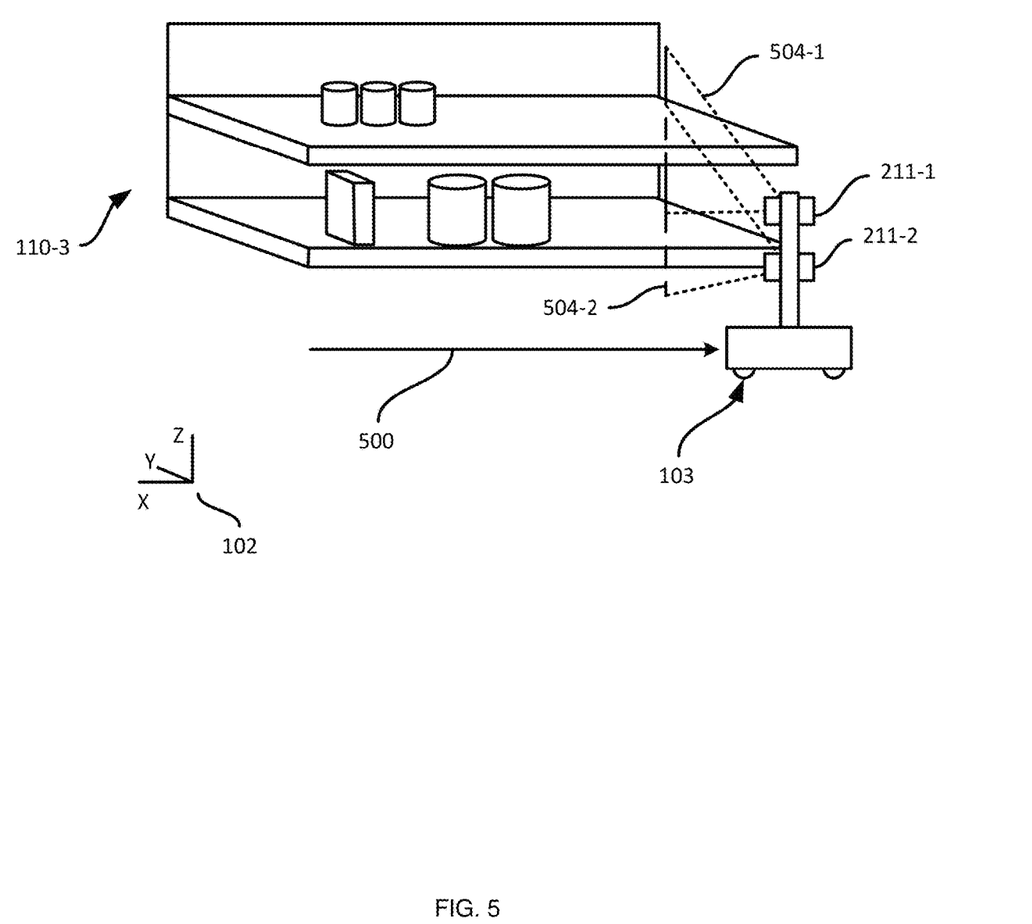
FIG. 5 is a diagram illustrating the capture of point cloud data for use in the method of FIG. 4.

Referring to FIG. 5, a simplified illustration of the collection of point cloud data by the apparatus 103 is provided. In particular, as the apparatus 103 travels along the shelves 110 (the shelf 110-3 is shown in FIG. 5 for illustrative purposes), in a direction of travel 500 substantially parallel to the shelf 110, the LIDARs 211-1 and 211-2 sweep respective beams (e.g. of laser light) through respective planar fields of view (FOV) 504-1 and 504-2. The dashed lines in FIG. 5 show the outer edges of each FOV 504. The FOVs 504 are shown as vertical FOVs in the present example, but may also be inclined relative to vertical in other examples. The beam for a given LIDAR 211 may be swept through the FOV (e.g. from top to bottom), thus capturing a depth measurement at each of a plurality of scan angles. The beam may then be shifted horizontally, and swept through the FOV again. This process may be repeated, generating a two-dimensional array of depth measurements.

As the apparatus travels in the direction 500, depth measurements are collected through repeated scans by each LIDAR 211. The collected depth measurements are registered to the frame of reference 102, e.g. based on the tracked location of the apparatus 103. The point clouds obtained at block 405 are assumed, in the present example, to represent the results of multiple scans, e.g. covering the entirety of the shelf module 110-3. In other examples, the processing described herein may be performed on smaller sets of depth measurements, however.

As seen in FIG. 5, the FOVs 504 overlap, and certain portions of the shelf module 110-3 are therefore represented in both point clouds. The overlap mentioned above is employed by the server 101 to detect and remove artifacts from one or both of the point clouds.

Figure 6:
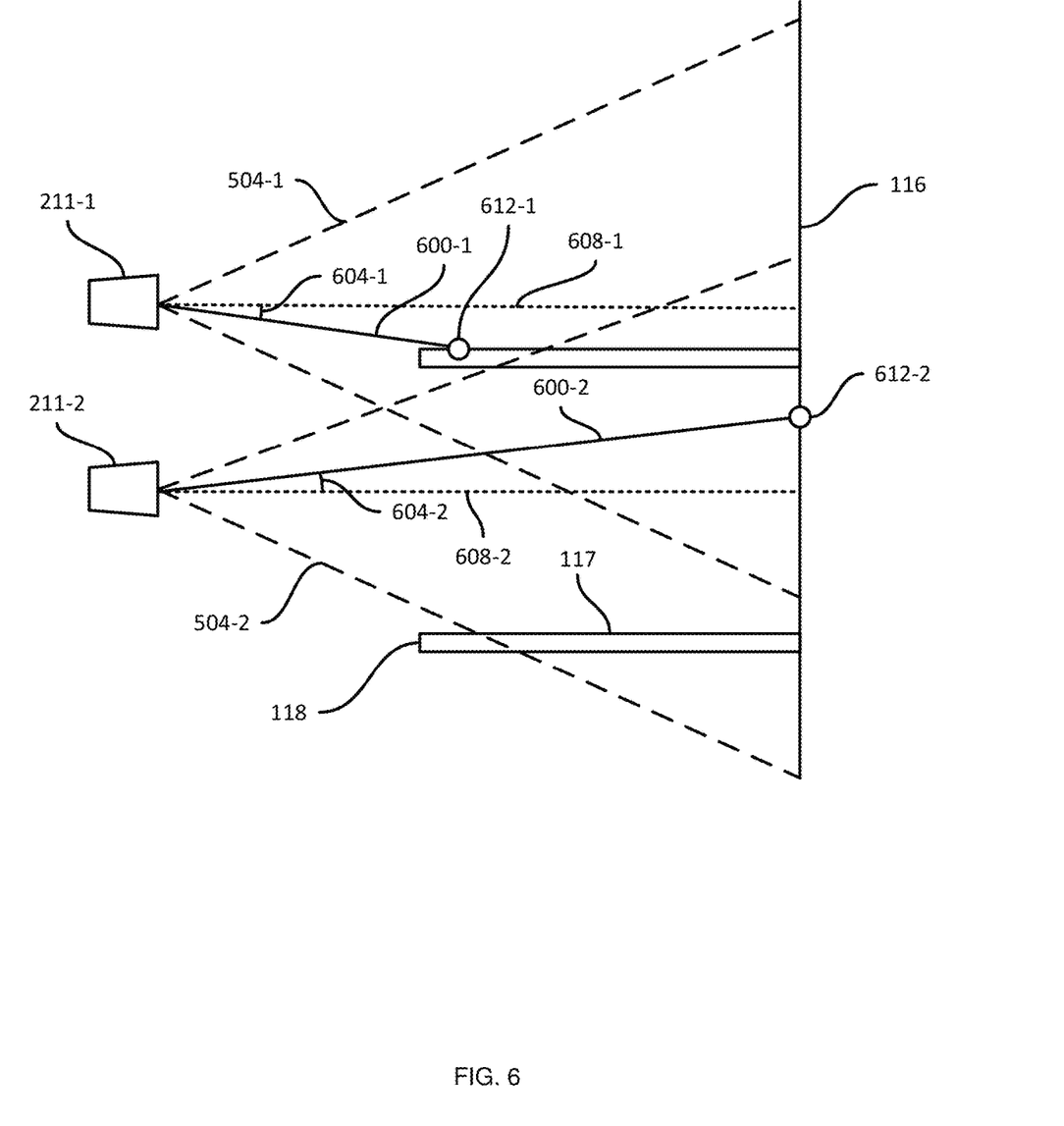
FIG. 6 is a diagram illustrating a side view of point cloud data capture.

FIG. 6 illustrates a side view of the LIDARs 211 (omitting the mast 205 and the remainder of the apparatus 103). As shown in FIG. 6, each LIDAR 211 sweeps a respective beam 600-1, 600-2 through the corresponding FOV 504. Each position of the beam 600 is defined by an angle 604-1, 604-2 between the beam and a center 608-1, 608-2 of the corresponding FOV 504. The angles 604 are also referred to as scan angles 604 herein. Thus, depth measurements (i.e. points) 612-1 and 612-2 are defined by the scan angles 604-1 and 604-2, respectively, as well as distances between the respective sensors 211-1 and 211-2 and the points 612-1 and 612-2. The points 612 (and any other points captured by the sensors 211) are assigned coordinates in the frame of reference 102. In particular, referring again to FIG. 5, each point captured by the sensors 211 is assigned a planar position, which in the present example is defined by X and Z coordinates. That is, the planar position of each point is the position of that point in the XZ plane, which in the present example is shown as being parallel to the front of the shelf module 110. Each point is also defined by a depth in the frame of reference 102, which in the present example is defined by a Y coordinate (i.e. a coordinate along an axis orthogonal to the XZ plane). Further, the scan angle 604 at which each point was captured is stored in conjunction with the point for later use in the artifact detection mechanism performed by the server 101.

Figure 7:
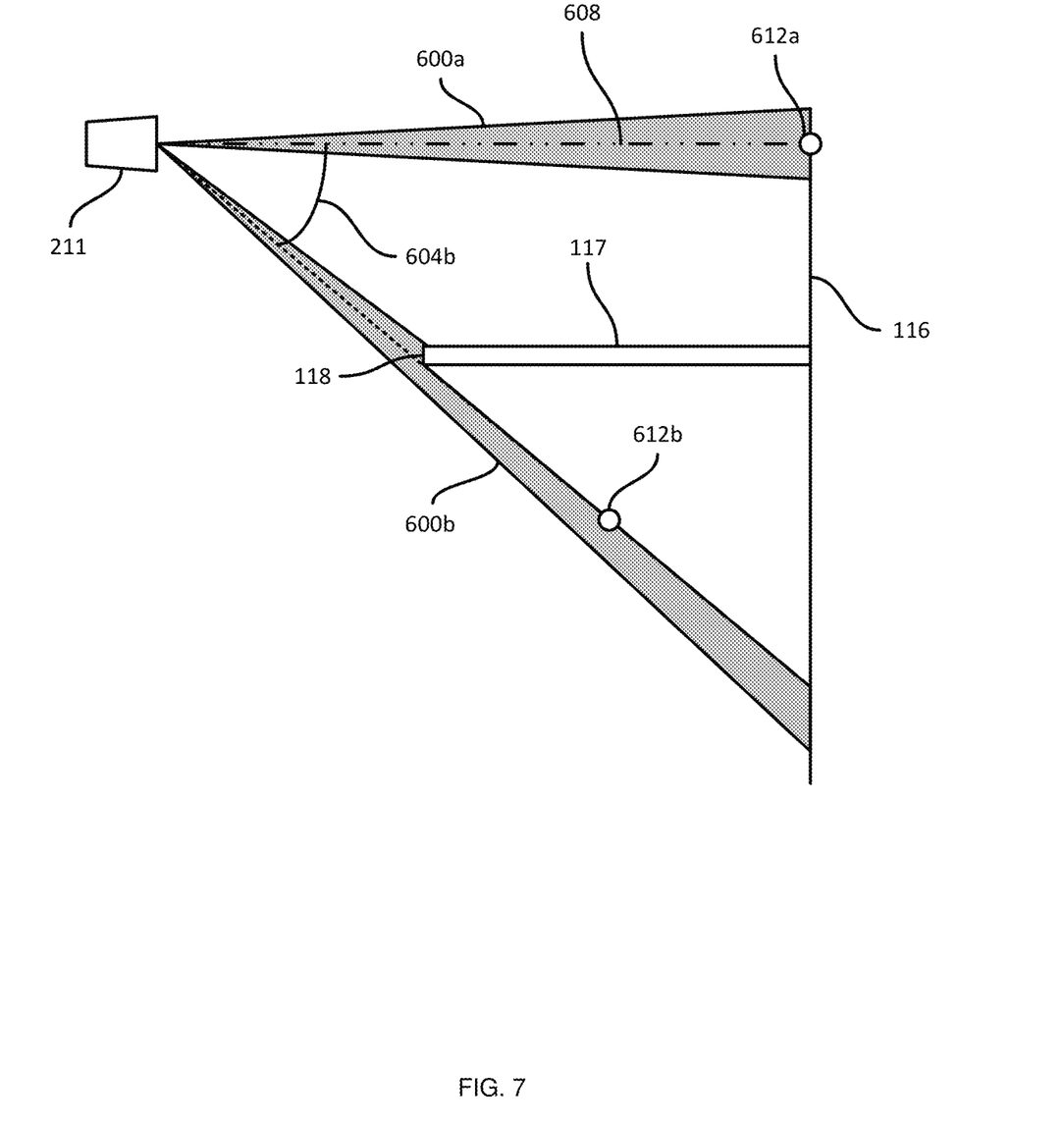
FIG. 7 is a diagram illustrating generation of an artifact during capture of a point cloud.

Before discussing the detection of artifacts according to the method 400, FIG. 7 illustrates an example of an artifact that the server 101 detects via performance of the method 400. In particular, a single sensor 211 is shown in FIG. 7, and two distinct positions of the beam 600 of the sensor 211 are shown. In particular, a beam 600a is shown, having a scan angle of zero degrees. That is, the beam 600a is emitted along the FOV center 608 of the sensor 211. A second beam 600b is also shown, having an angle 604b relative to the FOV center 608 that is assumed to be at the outer extent of the FOV of the sensor 211. As seen in FIG. 7, the beams 600a and 600b do not have constant widths as they travel away from the sensor 211. Thus, each beam 600 does not impact a single point on a surface such as the back of shelf 116, support surface 117, or shelf edge 118. Rather, each beam 600 impacts an area of the surface. The sensor 211 detects reflected portions of the beam from the impacted area and derives a single depth measurement, corresponding to a specific point. Points 612a and 612b resulting from the above derivation are shown in FIG. 7.

As will be apparent from FIG. 7, the point 612a represents a point on the shelf back 116. The point 612b, however, indicates the presence of an object where there is in fact no object. The beam 600b generates reflections from both the shelf back 116 and the shelf edge 118, and the sensor 211 is configured to interpolate the depth of the point 612b from the above reflections. The discontinuity between the shelf edge reflections and the shelf back reflections can cause the generation of a point such as the point 612b, which is an artifact that does not represent an actual object. Such artifacts can lead to incorrect detection of products on the shelf module 110 (i.e. to gaps on the shelf module 110 not being detected). The sensor 211 is more prone to generating such artifacts for beams 600 closer to the outer edges of the FOV 504, because the increased scan angles result in the beams 600 impacting larger areas, which are therefore more likely to include discontinuous surfaces such as those illustrated in FIG. 7. Beams at scan angles closer to the FOV center 608 impact smaller areas, and are therefore less prone to artifact generation. Therefore, as will be discussed below in greater detail, the server 101 validates candidate points from one or more of the point clouds from block 405 based with angles approaching the outer edges of the FOV 504. Specifically, the candidate points are classified as either valid or artifacts based on comparisons with validator points captured by other sensors 211. Thus, a candidate point from the sensor 211-1 may be classified based on a comparison with a validator point from the sensor 211-2. The validator point has a smaller scan angle (i.e. is closer to the FOV center 608-2) than the candidate point.

Returning to FIG. 4, at block 410 the server 101 labels each point in each of the selected point clouds obtained at block 405 as either an "extreme" point or a "non-extreme" point. Extreme points are those captured at scan angles prone to artifact generation, while non-extreme points are the remainder of the points captured by a sensor 211.

Figure 8:
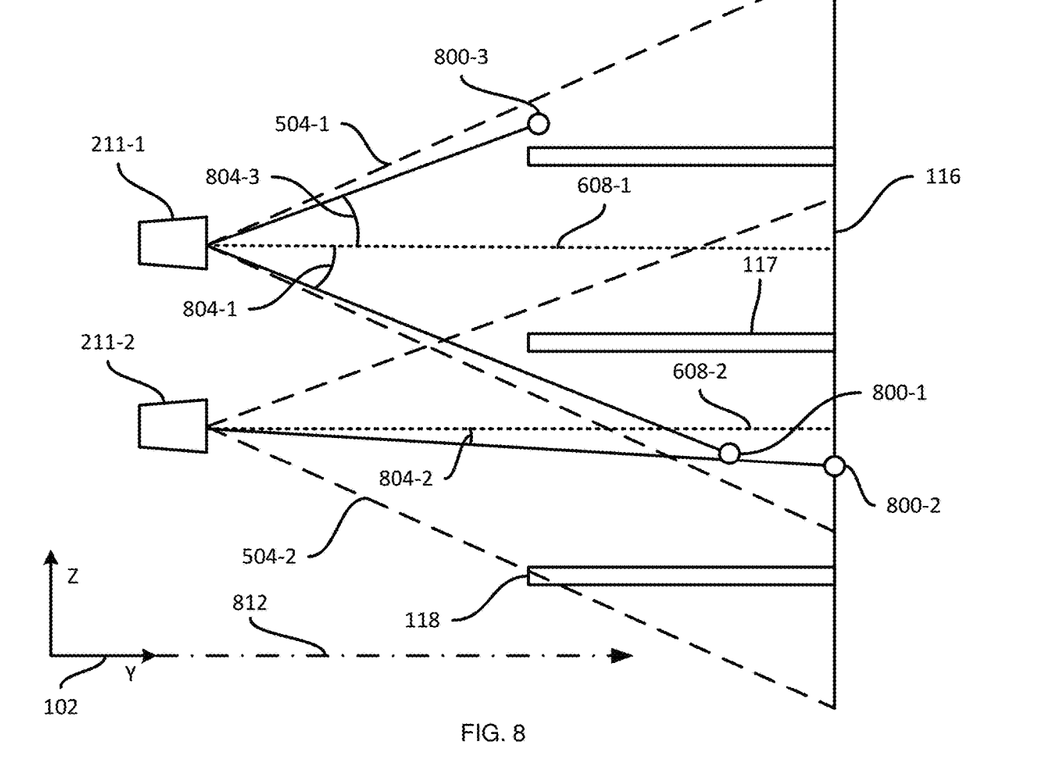
FIG. 8 is a diagram illustrating example candidate and validator points processed according to the method of FIG. 4.

FIG. 8 illustrates a side view of two example points 800-1 and 800-2 captured by, respectively, the sensor 211-1 and the sensor 211-2. Scan angles 804-1 and 804-2 for each point 800 are also illustrated. At block 410, the server 101 labels as extreme any points captured by each sensor with a scan angle that is greater than a configurable threshold. For example, the FOVs 504 have angles of about 50 degrees. Thus, the maximum scan angle for a point is about 25 degrees. The server 101 can label as extreme any points with scan angles greater than 20 degrees (either above or below the FOV center 608). In other examples, the threshold can be a percentage of the FOV. For example, the server 101 can label as extreme any points within the outer 15% of the corresponding FOV 504. Thus, any points captured by the sensor 211-1 with scan angles greater than about 17.5 degrees above or below the FOV center 608-1 may be labelled as extreme.

The scan angle 804-1 of the point 800-1 is assumed to exceed the above threshold, and the point 800-1 is therefore labelled as an extreme point. The scan angle 804-2 of the point 800-2, however, does not exceed the threshold, and the point 800-2 is therefore labelled as a non-extreme point. This process is repeated for every point in the point clouds from block 405.

Figure 9:
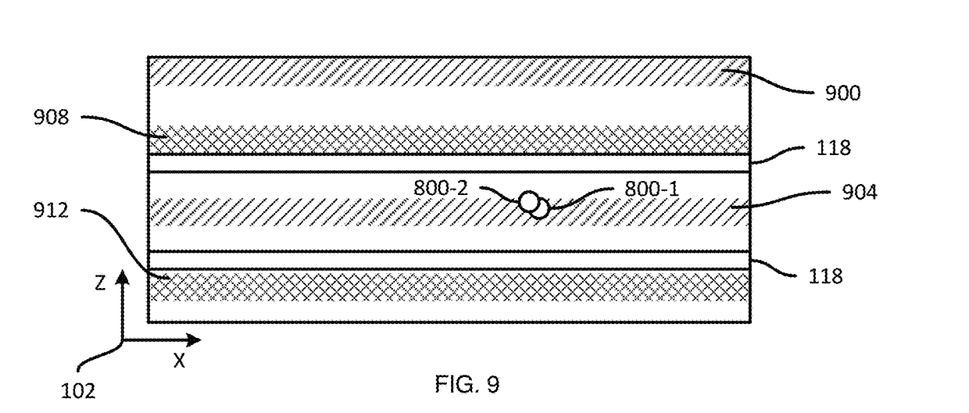
FIG. 9 is a diagram illustrating a front view of the points shown in FIG. 8.

While the depth (along the Y axis of the frame of reference 102) of the points 800 is visible in FIG. 8, the planar position of the points 800 (on the XZ plane of the frame of reference 102) is not visible. FIG. 9 illustrates the planar position of the points 800. FIG. 9 also illustrates regions 900 and 904 of the first point cloud, captured by the sensor 211-1, in which any points are labelled as extreme. As will be apparent from FIG. 8, the regions 900 and 904 correspond to scan angles near the outer edges of the FOV 504-1. Points captured by the sensor 211-1 in the region between the regions 900 and 904 are labelled as non-extreme points. A similar labelling operation is applied to the points captured by the sensor 211-2, resulting in points in the regions 908 and 912 captured by the sensor 211-2 being labelled extreme.

Returning to FIG. 4, at block 415 the server 101 selects a point cloud to validate, referred to as a candidate point cloud, and a point cloud with which to validate the candidate point cloud (referred to as a validator point cloud). In the present example, the first point cloud (captured by the sensor 211-1) is selected as the candidate, and the second point cloud (captured by the sensor 211-2) is selected as the validator. In other examples in which more than two point clouds are obtained at block 405, a single point cloud is selected as the candidate, but more than one point clouds may be selected as validators.

At block 420, the server 101 selects a candidate point from the candidate point cloud. The candidate point is selected from the subset of points labelled as extreme as described above. In some examples, selection of candidate points are restricted to extreme-labelled points with at least a threshold depth. For example, the threshold depth may be a portion (e.g. half) of the depth between a shelf edge 118 and a shelf back 116. In the context of accurately determining from the point clouds which portions of the shelf modules 110 are empty (and thus in which the shelf back 116 is visible), restricting the selection of candidate points as above reduces the risk of incorrectly detecting points that correspond to products as artifacts. In the present example performance of the method 400, the point 800-1 is selected as a candidate point at block 420. FIG. 8 illustrates an example threshold depth 812. Thus, a point 800-3 captured by the sensor 211-1, despite having a scan angle 804-3 that exceeds the scan angle threshold mentioned above, is not labelled as an extreme point because its depth does not exceed the threshold depth 812. Points such as the point 800-3 may correspond to products 112 rather than the shelf back 116, and are therefore excluded from validation to avoid incorrectly classifying points indicating the presence of products as artifacts.

At block 425, the server 101 searches the validator point cloud (i.e. the points captured by the sensor 211-2, in the present example) for a validator point that has a planar position that is within a configurable threshold distance of the candidate point. The validator point also has a smaller scan angle than the candidate point. In the present example, therefore, the server 101 searches only the non-extreme points of the validator point cloud at block 425. The distance assessed against the threshold is a planar distance, within the XZ plane. For example, referring to FIG. 9, the point 800-2 is assumed to be within the threshold distance of the point 800-1 (although as seen in FIG. 8, the depths of the points 800-1 and 800-2 differ significantly).

When no validator point is located, the determination at block 425 is negative, and the candidate point is classified as a valid point at block 430. Referring again to FIGS. 8 and 9, any points within the region 900, although labelled extreme and potentially prone to being artifacts, will be classified as valid points simply because the FOV 504-2 of the sensor 211-2 does not cover the region 900. The server 101 will therefore be unable to locate validator points from the sensor 211-2 that have similar planar positions to points in the region 900.

The determination at block 425 is affirmative for the candidate point 800-1, however, because as noted above, the point 800-2 has a planar position sufficiently close to the planar position of the candidate point 800-1. Further, as discussed earlier, the point 800-2 is a non-extreme point. As seen in FIG. 8, the scan angle 804-2 is smaller than the scan angle 804-1.

Following an affirmative determination at block 425, the server 101 proceeds to block 435. At block 435, the server 101 compares the depth of the validator point (e.g. the point 800-2) to the depth of the candidate point (e.g. the point 800-1). If the depth of the validator point exceeds the depth of the candidate point by at least a configurable threshold, the candidate point is classified as an artifact at block 440. The threshold may be zero, such that if the depth of the validator point exceeds the depth of the candidate point by any margin, the determination at block 435 is affirmative. In other examples, the threshold is larger than zero (e.g. 5 mm, although a wide variety of other thresholds smaller or larger than 5 mm may also be employed). In the present example, the depth of the validator point 800-2 does exceed the depth of the candidate point 800-1, and the candidate point 800-1 is therefore classified as an artifact at block 440. Classifying a candidate point as an artifact can include discarding the point (i.e. deleting it from the point cloud obtained at block 405). In other examples, classifying a point as an artifact includes labelling the point as an artifact, for subsequent processing (which may also include deletion). When the determination at block 435 is negative, the candidate point is classified as a valid point at block 430.

Figure 10:
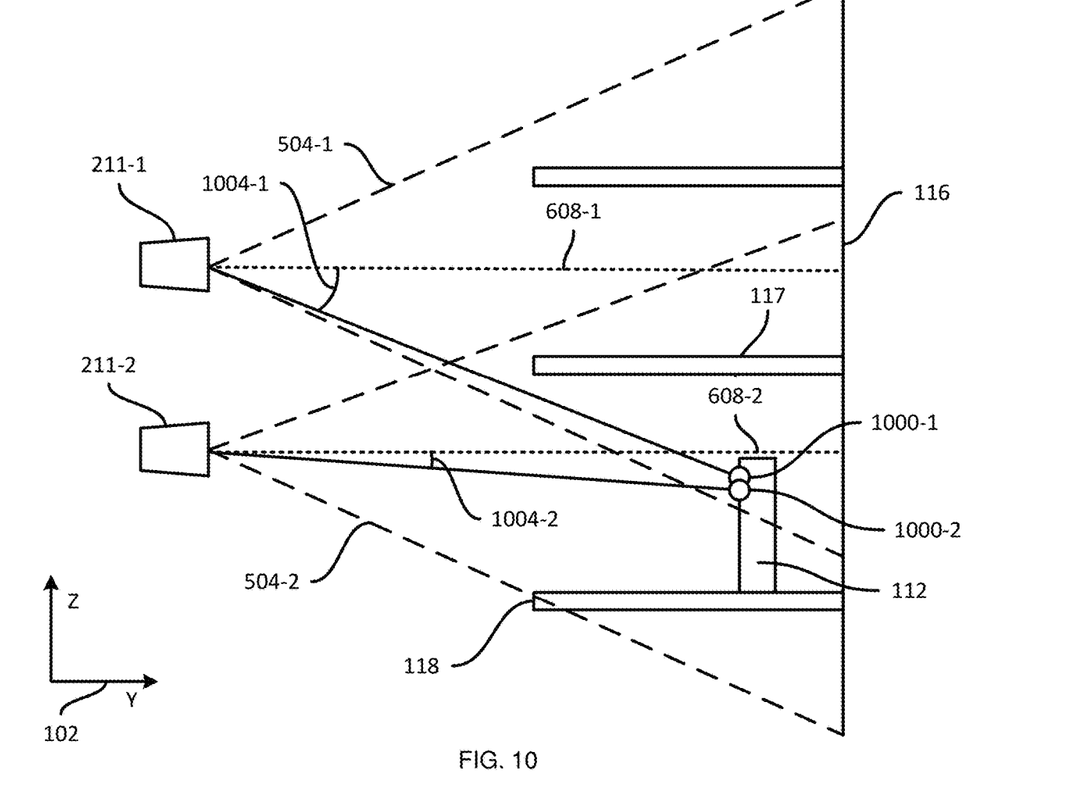
FIG. 10 is a diagram illustrating further example candidate and validator points processed according to the method of FIG. 4.
Figure 11:
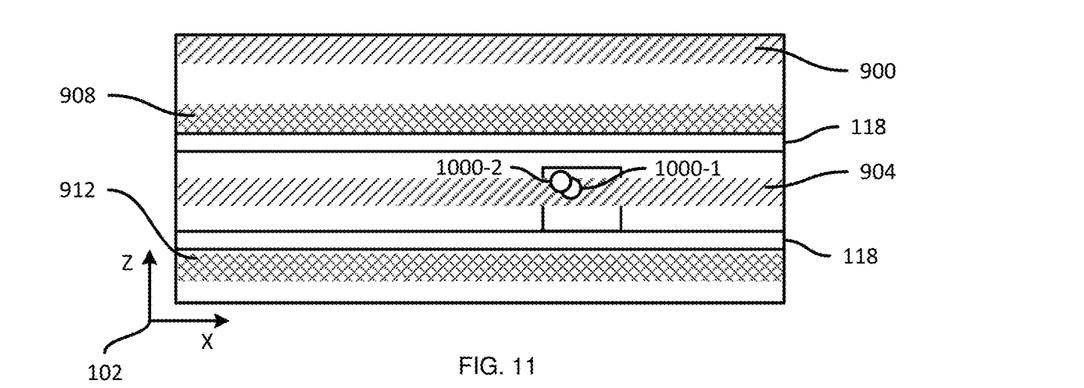
FIG. 11 is a diagram illustrating a front view of the points shown in FIG. 10.

Turning briefly to FIGS. 10 and 11, another example is shown in which a point 10001 captured by the sensor 211-1 is labelled as extreme (falling in the region 904, as shown in FIG. 11). A point 1000-2 captured by the sensor 211-2 is identified as a validator point. However, the depth of the validator point 1000-2 does not exceed the depth of the candidate point 1000-1, and the determination at block 435 is therefore negative. Indeed, as seen in FIG. 10, the points 1000-1 and 1000-2 correspond to points on a product 112, and the candidate point 1000-1 is therefore not an artifact.

Returning to FIG. 4, at block 445 the server 101 determines whether any candidate points remain to be processed. That is, in the present example the server 101 determines whether any candidate points (i.e. points labelled as extreme) from the sensor 211-1 have not yet been classified. When the determination at block 445 is affirmative, the server 101 performs blocks 420 and 425, as well as the relevant ones of blocks 435, 440 and 430 (based on the determinations at blocks 420 and 435), for the next candidate point.

When no candidate points remain, the server 101 determines, at block 450, whether any point clouds remain to be validated. In some examples, each point cloud obtained at block 405 is validated. Therefore, having completed validation of the extreme points in the first point cloud (from the sensor 211-1), the server 101 may make an affirmative determination at block 450 because the second point cloud (from the sensor 211-2) has not been validated. The server 101 then returns to block 415, selects the second point cloud as the candidate point cloud and the first point cloud as the validator point cloud, and repeats the process described above to validate extreme points of the second point cloud.

In other examples, the server 101 need not be configured to validate each point cloud obtained at block 405. Instead, for example, the server 101 can validate only the first point cloud. Responsive to determining that all point clouds to be validated have been validated at block 450, the performance of the method 400 ends. The server 101 stores the processed point clouds (e.g. with artifacts deleted) in the memory 122 for subsequent use, for example by gap detection routines executed by the server 101 or another suitable computing device.

Figure 12:
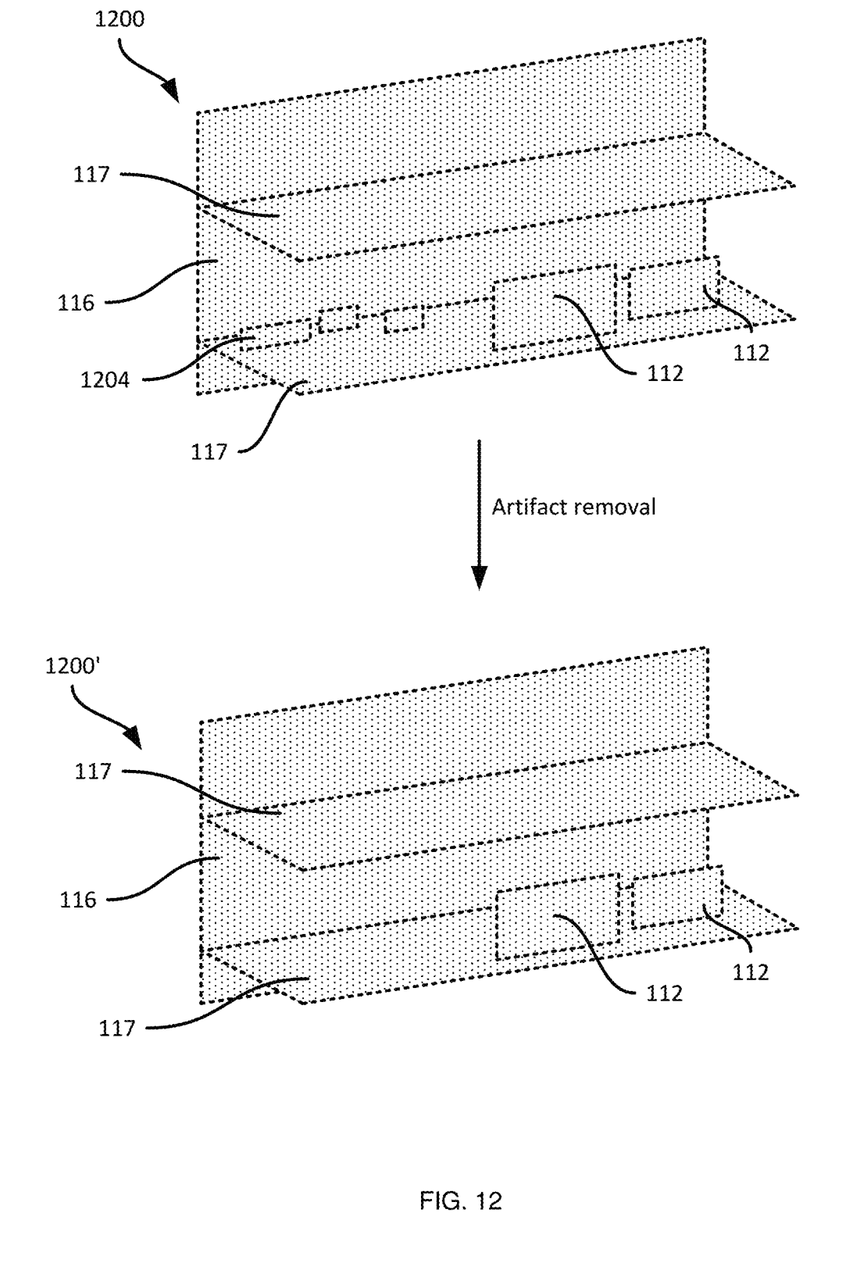
FIG. 12 is a diagram illustrating a point cloud before and after processing via the method of FIG. 4.

Referring to FIG. 12, a point cloud 1200 generated from at least two pluralities of points captured by respective sensors 211 is shown prior to processing via the method 400. Specifically, the point cloud 1200 represents a shelf module 110 include a shelf back 116 and two support surfaces 117, one of which supports products 112. In addition, the point cloud 1200 represents three objects 1204 near the shelf back 116. Via the performance of the method 400, the server 101 determines that the points representing the objects 1204 are in fact artifacts generated by one of the sensors 211. That is, the objects 1204 do not exist, and may have led to incorrect product status detection by the server 101 or another computing device. A point cloud 1200' generated via performance of the method 400 is shown, in which the objects 1204 no longer appear. The above-mentioned product status detection mechanisms may therefore correctly detect gaps on the shelf 110 where the mechanisms previously would have detected products.

Variations to the above systems and methods are contemplated. For example, in other embodiments the points of each point cloud obtained at block 405 need not be labelled as extreme or non-extreme based on the angular threshold mentioned above. That is, block 410 of the method 400 can be omitted. Instead of searching for a validator point labelled as non-extreme, the server 101 can search for a validator point with a smaller scan angle than the candidate point. The candidate points, in turn, can be selected based on an angular threshold, or the entirety of the candidate point cloud can be validated.

In other embodiments, as noted earlier, the apparatus 103 may include more than two LIDARs 211. In such embodiments (e.g. when the apparatus 103 includes four LIDARs 211), the server 101 can store an indication of which LIDARs have FOVs 504 that overlap. During the performance of the method 400, the server 101 can therefore select validator point clouds at block 415 based on the above indication, omitting any point clouds that do not overlap with the candidate point cloud.

As will be apparent from the discussion above, point clouds representing support structures such as the shelf modules 110 are most prone to depth sensor artifacts near the discontinuities between shelf edges 118 and shelf back 116. Such a discontinuity, when viewed from above (as in the case of the sensor 211-1 shown in FIG. 8), may result in artifacts that appear to represent objects on a lower support surface. When viewed from below, however, the discontinuity may result in artifacts that appear to represent objects floating above an upper support surface. Because downstream processing mechanisms such as gap detectors may be configured to disregard floating objects, in some embodiments the server 101 can limit validation to extreme points near the lower edge of the FOV 504 of each sensor. Scan angles, for example, may indicate by positive or negative sign whether the corresponding point is near the upper edge of the FOV 504 (as with the point 800-3 in FIG. 8) or the lower edge (as with the point 800-1). The server 101 may be configured to evaluate only negative scan angles when selecting candidate points.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in an imaging controller of detecting depth sensor artifacts, the method comprising:
   obtaining, from a first sensor, a first plurality of points defined by respective (i) first planar positions and first depths in a common frame of reference, and (ii) first scan angles relative to a field of view (FOV) center of the first sensor;
   obtaining, from a second sensor, a second plurality of points defined by respective (i) second planar positions and second depths in the common frame of reference, and (ii) second scan angles relative to an FOV center of the second sensor;
   for each candidate point of a subset of candidate points from the first plurality of points:
      searching the second plurality of points for a validator point having (i) a second planar position within a threshold distance of a first planar position of the candidate point, and (ii) a second scan angle smaller than a first scan angle of the candidate point; and
      responsive to identifying the validator point:
         when a second depth of the validator point exceeds a first depth of the candidate point, classifying the candidate point as an artifact.

2. The method of claim 1, further comprising:
   responsive to failing to identify a validator point, classifying the candidate point as a valid point.

3. The method of claim 1, wherein classifying the candidate point as an artifact comprises discarding the point.

4. The method of claim 1, further comprising:
   selecting a set of points from the first plurality of points having depths greater than a selection threshold; and
   selecting the subset of candidate points from the selected set of points.

5. The method of claim 4, wherein the first and second pluralities of points represent a support structure having a shelf edge at a first depth, and a shelf back at a second depth; and wherein the selection threshold is a portion of a difference between the first and second depths.

6. The method of claim 1, further comprising:
   selecting the subset of candidate points based on the first scan angles of the first plurality of points.

7. The method of claim 6, wherein selecting the subset of candidate points comprises selecting ones of the first plurality of points having first scan angles within an angular threshold of an edge of the FOV of the first sensor.

8. The method of claim 7, further comprising, prior to selecting the subset of candidate points, for each point of the first plurality of points:
   labelling the point as an extreme point if the first scan angle of the point is within the angular threshold of the edge of the FOV of the first sensor; and
   otherwise labelling the point as a non-extreme point.

9. The method of claim 8, further comprising, for each point of the second plurality of points:
   labelling the point as an extreme point if the second scan angle of the point is within the angular threshold of an edge of the FOV of the second sensor; and
   otherwise labelling the point as a non-extreme point;
   wherein searching the second plurality of points comprises searching only among the points of the second plurality of points labelled as non-extreme points.

10. The method of claim 9, further comprising, for each second candidate point of a subset of second candidate points from the second plurality of points:
    searching the first plurality of points for a further validator point having (i) a first planar position within a threshold distance of a second planar position of the second candidate point, and (ii) a first scan angle smaller than a second scan angle of the second candidate point; and
    responsive to identifying the further validator point:
       when the first depth of the further validator point exceeds the second depth of the second candidate point, classifying the second candidate point as an artifact.

11. A computing device comprising:
    a memory storing:
       a first plurality of points from a first sensor, defined by respective (i) first planar positions and first depths in a common frame of reference, and (ii) first scan angles relative to a field of view (FOV) center of the first sensor; and
       a second plurality of points from a second sensor, defined by respective (i) second planar positions and second depths in the common frame of reference, and (ii) second scan angles relative to an FOV center of the second sensor; and
    an imaging controller configured, for each candidate point of a subset of candidate points from the first plurality of points, to:
       search the second plurality of points for a validator point having (i) a second planar position within a threshold distance of a first planar position of the candidate point, and (ii) a second scan angle smaller than a first scan angle of the candidate point; and
       responsive to identification of the validator point:
          when a second depth of the validator point exceeds a first depth of the candidate point, classify the candidate point as an artifact.

12. The computing device of claim 11, wherein the imaging controller is further configured, responsive to a failure to identify a validator point, to classify the candidate point as a valid point.

13. The computing device of claim 11, wherein the imaging controller is further configured, responsive to classification of the candidate point as an artifact, to discard the point.

14. The computing device of claim 11, wherein the imaging controller is further configured to:
    select a set of points from the first plurality of points having depths greater than a selection threshold; and
    select the subset of candidate points from the selected set of points.

15. The computing device of claim 14, wherein the first and second pluralities of points represent a support structure having a shelf edge at a first depth, and a shelf back at a second depth; and wherein the selection threshold is a portion of a difference between the first and second depths.

16. The computing device of claim 11, wherein the imaging controller is further configured to select the subset of candidate points based on the first scan angles of the first plurality of points.

17. The computing device of claim 16, wherein the imaging controller is further configured, in order to select the subset of candidate points, to select ones of the first plurality of points having first scan angles within an angular threshold of an edge of the FOV of the first sensor.

18. The computing device of claim 17, wherein the imaging controller is further configured to, prior to selecting the subset of candidate points, for each point of the first plurality of points:
    label the point as an extreme point if the first scan angle of the point is within the angular threshold of the edge of the FOV of the first sensor; and
    otherwise label the point as a non-extreme point.

19. The computing device of claim 18, wherein the imaging controller is further configured, for each point of the second plurality of points, to:
    label the point as an extreme point if the second scan angle of the point is within the angular threshold of an edge of the FOV of the second sensor;
    otherwise label the point as a non-extreme point; and
    in order to search the second plurality of points, search only among the points of the second plurality of points labelled as non-extreme points.

20. The computing device of claim 19, wherein the imaging controller is further configured, for each second candidate point of a subset of second candidate points from the second plurality of points, to:
    search the first plurality of points for a further validator point having (i) a first planar position within a threshold distance of a second planar position of the second candidate point, and (ii) a first scan angle smaller than a second scan angle of the second candidate point; and
    responsive to identification of the further validator point:
        when the first depth of the further validator point exceeds the second depth of the second candidate point, classify the second candidate point as an artifact.

\* \* \* \* \*